June 2, 1964     T. W. ROYER     3,135,416
PORT OPENING DEVICE

Filed July 25, 1960     2 Sheets—Sheet 1

INVENTOR.
BY THURBER W. ROYER
ATTORNEY

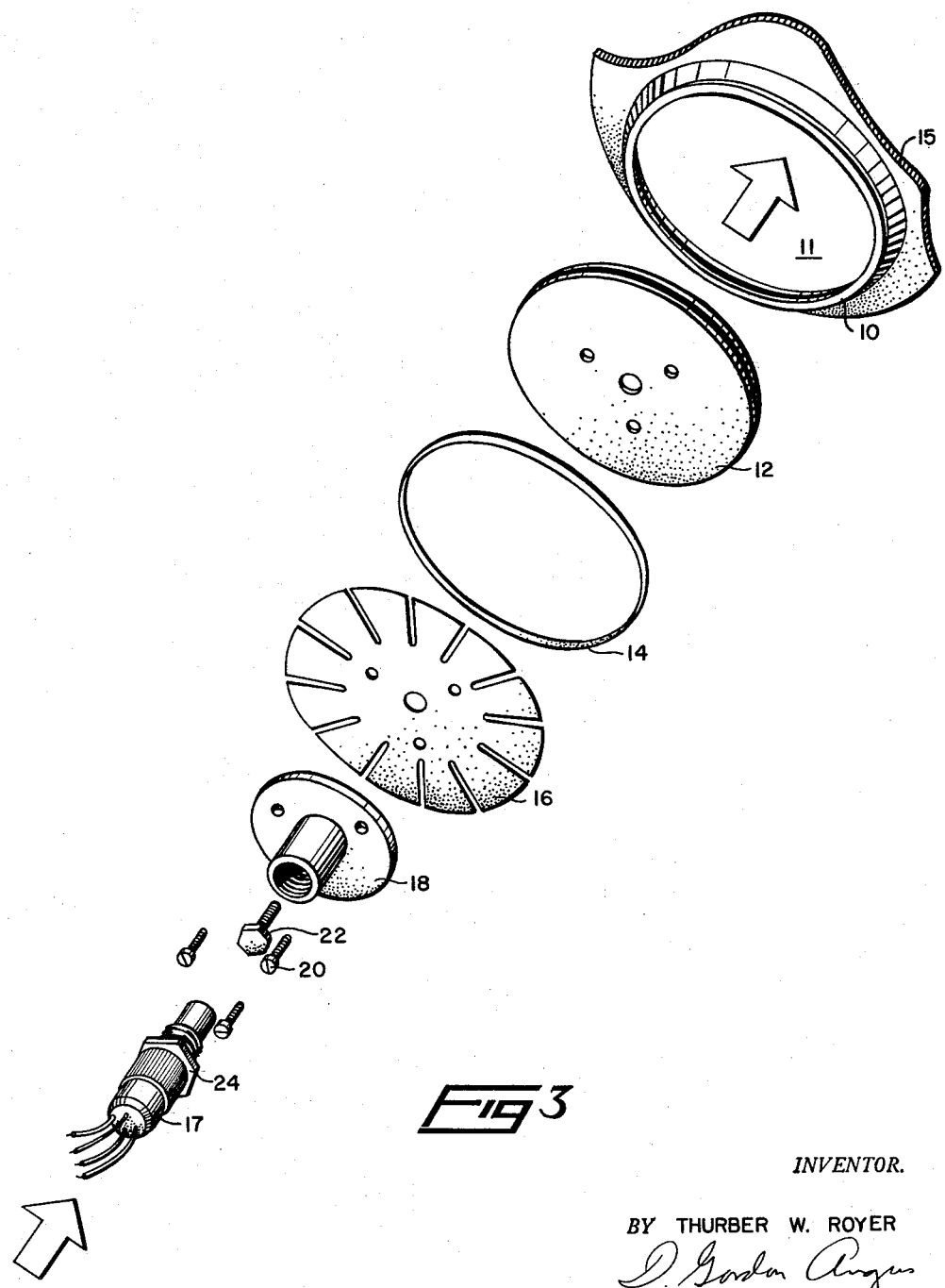

United States Patent Office 3,135,416
Patented June 2, 1964

**3,135,416
PORT OPENING DEVICE**
Thurber W. Royer, Arcadia, Calif., assignor to Aerojet-General Corporation, Azusa, Calif., a corporation of Ohio
Filed July 25, 1960, Ser. No. 45,231
5 Claims. (Cl. 220—47)

This invention relates to pressure release devices generally, and specifically to such devices which are operable in one millisecond or less.

Many situations require a quickly releasing pressure relief device. Typical applications for such a device are in opening a thrust reverser port in the forward head of a rocket motor chamber, or to provide pressure relief in a pressure vessel. Existing pressure relief devices often utilize mechanisms which have an inherent time delay and offer the possibility of difficulty with the moving parts.

It is, therefore, the principal object of the present invention to provide a novel pressure release device capable of very rapid operation and which is light in weight and simple in construction.

It is another object of the present invention to provide a novel method of and improved means for opening pressure vessel ports within a time period of one millisecond, or less.

In its principal aspect, the device comprises pressure retaining plug means arranged in a bossed opening in a pressure vessel. A quick acting gas generating means is provided within the plug which, upon actuation, causes the means retaining the plug in the opening to fail. The internal pressure within the charged vessel will forceably remove the plug from the bossed port.

These and other objects, aspects and features of the invention will be apparent to those skilled in the art from the following more detailed description taken together with the appended drawings wherein.

Figure 2:
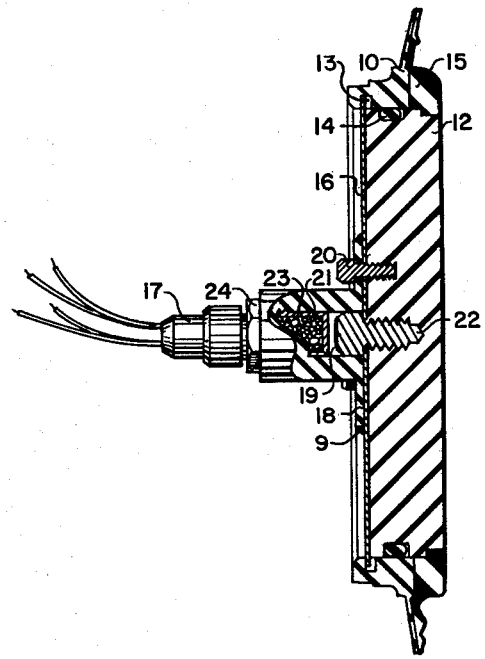
FIG. 2 is a sectional view of the device of the present invention taken along section line 2—2 of FIG. 1; and, FIG. 3 is an exploded view showing the device as it would be assembled to fit in a pressure relief port of a pressure vessel.
Figure 1:
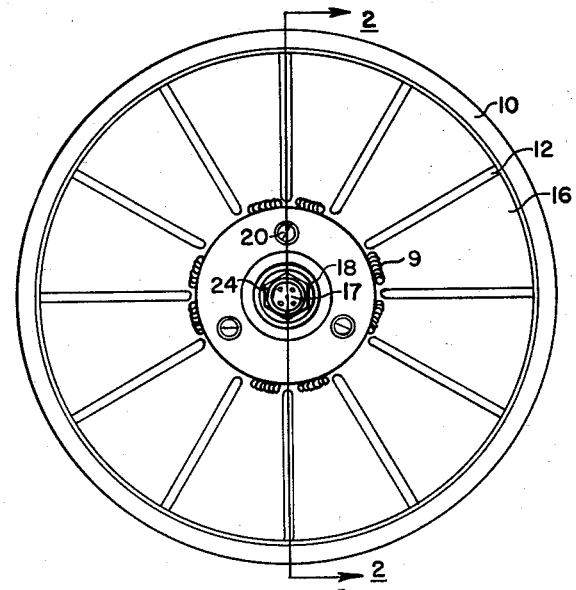
FIG. 1 is a plan view of the device of this invention.

With reference to the figures, the pressure relief device comprises a pressure retaining plug 12 adapted to be installed in a flanged boss 10 constituting a port 11 in a pressure vessel wall 15. An O-ring 14 is arranged within a recess in the periphery of the plug 12 to provide a pressure-tight seal with the periphery of the port 11 in the boss 10. The plug 12 is retained within the port 11 by a thin, slotted metal spring retainer disc 16 which is slightly larger in diameter than the plug 12. Because of its flexible construction the disc 16 may be compressed, and then expanded to seat in a small peripheral groove 13 in the port wall thereby holding the plug 12 in position to close the port 11. A flanged housing 18 is attached to the outer surface of the disc 16, by brazing, welding, or other permanent means, shown here as a weld 9. Frangible retaining screws 20 serve to hold the disc 16 flat against the top surface of the plug 12. Utilization of the retaining screws 20 in this manner will prevent the disc 16 from bowing upwardly and outwardly in the center thereof and slipping from the retaining groove 13 because of the pressure applied to the reverse surface of the plug 12 when the pressure vessel is charged. The flanged housing 18 has a threaded chamber adapted to receive a threaded explosive actuator 17, shown here as an electrically actuated squib, in a manner leaving a small space 19 between the bottom of the actuator 17 and the top of a set screw 22 leading into the top surface of the plug 12. A lock nut 24 holds the actuator 17 within the threaded chamber of the housing 18. As seen from the cut-away portion of FIG. 2, the casing 21 of the actuator 17 illustrated in the embodiment contains an explosive 23 such as gun powder. Other explosives may be used.

When it is desired to effect a quick pressure relief of the pressure vessel, the explosive actuator 17 is energized by an external source, such as from an electrical source (not shown). The resulting detonation generates gaseous products of combustion having a high pressure within the small enclosed space 19 within the housing 18. This extreme pressure acts against the head of the set screw 22 which serves as a fixed piston. The pressure build up causes the frangible retaining screws 20 to fail in tension and thereby enables the housing 18 to lift the disc 16 in its center. As a result, the outer periphery of the disc 16 is decreased, and the disc 16 is pulled from its position in the groove 13 in the flanged boss 10 of the pressure vessel wall 15. Internal pressure within the pressure vessel will force the plug 12 out of the port 11.

Tests made with this pressure release device with a plug diameter of 3 and ½ inches, and gas pressure within the pressure vessel of 500 lbs. per square inch, have resulted in the plug clearing the opening in less than 1 millisecond after an electric current is imposed on the bridge wire of the charge igniter. Equally satisfactory results may be obtained with other plug sizes and at different vessel pressures.

It is to be understood that the form of the invention herewith shown and described is to be taken as a preferred example of the same, and that various changes in the shape, size and arrangement of the parts may be resorted to, without departing from the spirit of such invention, or the scope of the claims. For example, in the place of the explosive actuator 17, frangible retaining screws 20, and the set screw 22, an explosive bolt may be utilized, the threaded portion of the bolt serving to join the spring retainer 16 and plug 12. Detonation of the bolt will free the spring retainer 16, allowing the plug 12 to be forced from the pressure vessel. Also, it is not essential that an O-ring 14 be employed to effect a pressure-tight seal between the plug 12 and the periphery of the port 11. A U cup sealing means might be used, to cite one example. Other obvious variations will occur to those skilled in the art.

I claim:

1. A pressure relief device adapted for installation in a port of a pressure vessel comprising: a plug member in pressure-tight engagement with the walls of the port; spring means in holding relationship with said plug member within the port; and explosive means for removing said spring means from holding relationship with said plug member; whereby the internal pressure within said pressure vessel will force said plug member from the port upon actuation of said explosive means.

2. A pressure relief device adapted for installation in a flanged port of a pressure vessel comprising, pressure-retaining plug means, said plug means being arranged within said port against said flange in pressure-tight relationship with the wall of said port, said port wall having a peripheral groove therein, a spring retainer means fitted within said wall groove to hold said plug means in position in said port, means for rapidly producing a fluid at a high pressure; means for housing said fluid producing means; frangible means joining said spring retainer means to said plug means; whereby actuation of said fluid producing means causes failure of said frangible means, thereby removing said retainer means from contact with said plug means, the internal pressure within said vessel forcing said plug means from said port.

3. A pressure relief device adapted for installation in a grooved flanged port within a wall of a pressure vessel comprising, a plug member having a peripheral O-ring receiving groove, said member being adapted to fit within and engage the internal wall of said port; an O-ring seated in said plug member groove; a slotted retainer disc abutting that surface of said plug opposite the pressure vessel interior, said disc fitting within the peripheral groove in the wall of said port to hold said plug and ring against the flange in pressure-tight relationship with the port wall; means for housing an explosive actuator; means for permanently joining said housing means to said disc; frangible means joining together said housing means, said slotted disc and said plug member; and an explosive actuator arranged within said housing means; whereby detonation of said actuator will shear said frangible means, thereby releasing said slotted disc from the groove in the port wall and permitting the pressure within the vessel to force the plug member and ring from the port.

4. In a pressure vessel having an annular flanged port with a peripheral groove in the walls thereof, the combination of a plug member within said port, said plug member having an annular peripheral groove adapted to receive an O-ring therein, an O-ring fitting in said plug groove to provide a pressure-tight fit with the walls of said port, a spring retainer member, an explosive bolt having a threaded portion thereon, said spring member arranged to fit within said annular peripheral groove of said port to hold said plug between said retainer member and said flange within said port, said threaded portion of said bolt joining said spring retainer to said plug member, whereby actuation of said explosive bolt severs the union between said spring retainer member and said plug member, removing said spring retainer member from said port groove, the internal pressure within said pressure vessel thereby forcing said plug member from said port.

5. A pressure relief device adapted for installation in a grooved flanged port within the wall of a charged pressure vessel comprising: a plug member having inner and outer lateral surfaces and a peripheral surface and adapted to receive pressure sealing means at the peripheral surface thereof; pressure sealing means; said plug member and said pressure sealing means fitting in pressure tight engagement with the internal wall of said port; a slotted retainer disc capable of temporary radial deformation, said disc arranged within the peripheral groove in said port to urge the inner lateral surface of said plug against the port flange; frangible means for retaining said disc in flat relationship with the outer lateral surface of said plug member; means for housing an explosive actuator; means for permanently joining said housing means to said disc; and an explosive actuator arranged within said housing means; whereby detonation of said actuator will shear said frangible means, the resulting outward movement of said housing means deforming said disc in a manner releasing it from the groove in the port wall and permitting the pressure within the vessel to force the plug member from the port.

References Cited in the file of this patent

UNITED STATES PATENTS

| | | |
|---|---|---|
| 929,974 | McNutt | Aug. 3, 1909 |
| 2,218,483 | Scharmett | Oct. 15, 1940 |
| 2,712,881 | Mathisen | July 12, 1955 |